US012546152B2

(12) United States Patent
Guest

(10) Patent No.: US 12,546,152 B2
(45) Date of Patent: Feb. 10, 2026

(54) SECURITY DEVICE

(71) Applicant: GUEST PRECISION MACHINING, INC., Hull, GA (US)

(72) Inventor: Glenn Allen Guest, Hull, GA (US)

(73) Assignee: Guest Precision Machining, Inc., Hull, GA (US)

( * ) Notice: Subject to any disclaimer, the term of this patent is extended or adjusted under 35 U.S.C. 154(b) by 163 days.

(21) Appl. No.: 18/380,280

(22) Filed: Oct. 16, 2023

(65) Prior Publication Data

US 2024/0125156 A1 Apr. 18, 2024

Related U.S. Application Data

(60) Provisional application No. 63/464,405, filed on May 5, 2023, provisional application No. 63/454,894, filed on Mar. 27, 2023, provisional application No. 63/416,817, filed on Oct. 17, 2022.

(51) Int. Cl.

| | |
|---|---|
| ***E05C 1/04*** | (2006.01) |
| ***E05B 63/12*** | (2006.01) |
| ***E05C 7/04*** | (2006.01) |
| ***E05D 11/10*** | (2006.01) |

(52) U.S. Cl.

CPC ................ *E05C 1/04* (2013.01); *E05B 63/12* (2013.01); *E05C 7/045* (2013.01); *E05D 11/1007* (2013.01)

(58) Field of Classification Search

CPC ...... E05B 63/12; E05B 15/10; E05B 17/2003; E05B 17/2084; E05B 17/2088; E05C 1/04; E05C 7/045

See application file for complete search history.

(56) References Cited

U.S. PATENT DOCUMENTS

| | | | | |
|---|---|---|---|---|
| 309,813 A * | 12/1884 | Bothwell | ................ | E05B 63/20 292/156 |
| 4,227,386 A * | 10/1980 | Crockett | ................... | E05C 1/04 70/120 |
| 2021/0355712 A1* | 11/2021 | Creighton | ............... | E06B 5/113 |

* cited by examiner

*Primary Examiner* — Christine M Mills
*Assistant Examiner* — Peter H Watson
(74) *Attorney, Agent, or Firm* — Smith Tempel Blaha LLC; Matthew T. Hoots

(57) ABSTRACT

A security device that can be activated or deactivated on the interior side of a door or window or other passageway barricade, and that can be activated or deactivated on the exterior side of the door with a special mechanism, such as a key, tool, transmitter, etc. The security device may be mounted to the hinge-side of a door, the knob-side of a door or in a scenario that includes a non-mullion double door, to the two adjoining portions of the doors at the middle joint.

2 Claims, 15 Drawing Sheets

SECURITY DEVICE

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the following United States provisional applications for patent:

Ser. No. 63/416,817 filed on Oct. 17, 2022;

Ser. No. 63/454,894 filed on Mar. 27, 2023; and

Ser. No. 63/464,405 filed on May 5, 2023, which applications are incorporated herein by reference in their entireties.

BACKGROUND

Active shooter and other emergency scenarios have become all too common in today's schools. In such scenarios, faculty and students are taught to close the door to their classrooms and barricade themselves inside, among taking other actions. Additional security devices on the doors (beyond a typical lockset and deadbolt) that increase the security provided by the door may be desirable to mitigate the chances that the door may be forcefully opened from the exterior. However, once the emergency is removed or neutralized, or if other scenarios arise (i.e., smoke, fire, injuries, chemical issues), authorities or medical personnel may need a means by which the locking mechanisms of any additional security device can be disengaged, or overridden, from the exterior of the door. This is particularly important when the persons on the interior of the door are in peril, incapacitated, injured, etc. Thus, it is necessary to provide a mechanism for emergency personnel to open any barricades from the exterior without requiring any person inside the barricaded room to take action.

In countless situations, the mechanisms that were intended to bring safety to occupants behind a door wound up trapping the occupants in a building, inaccessible to first responders or others that were attempting to help or rescue the occupants. The triangle shirtwaist factory fire is one of the most horrific events that identified how problematic it is in attempting to balance security yet providing safe egress of a building. In this tragic event in Manhattan NY on Mar. 25, 1911, 146 workers were killed in a rapidly spreading fire. One of the problems that exasperated this tragedy was that to prevent the theft of equipment in the factory, managers had locked many of the exit doors. When the fire broke out, the workers were not able to make a quick exit and others were not able to come to the rescue of the workers. An integral element of the NFPA101: Life Safety Code is the provision of free egress, which means that occupants must be able to exit a building without the use of any keys, tools, special knowledge, or effort.

Therefore, there is a need in the art for a new and novel door security device that addresses the above articulated needs in the art as well as other needs.

SUMMARY

The present invention relates to systems and methods for door security and, more particularly, to a novel security device that can be used secure, or further secure, an ingress barricade but, that provides free and easy egress to the inhabitants and the ability for necessary personnel to disengage the security device from the exterior of the barricade. In some embodiments, the security device can further be used to mount a door to a door jamb or casing and to operate as a door hinge in one mode of operation and/or to operate as a securing lock in another mode of operation. In one embodiment, the device is mounted to the hinge-side of a door jamb/casing such that when the door is closed a user may engage a bolt of the security device to prevent forceful opening of the door from the exterior. Embodiments of the solution may include a disengaging means that is accessible from the exterior of the door.

Exemplary embodiments of a novel, hinge-side door security device are disclosed. Embodiments of the solution are configured such that a user may quickly engage a locking mechanism on the interior side of a door that provides an additional level of security beyond an existing lockset and/or deadbolt. Advantageously, the locking mechanism of the hinge-side door security device may be disengaged from outside the door via a unique key or tool configured to access the locking mechanism through an aperture in the door.

One embodiment includes a security device for locking a passageway barricade, which could be a door, a panel, a window, a trap door, etc. The security device includes a latching element coupled to an interior surface of a moveable element (i.e., a door) of the passageway barricade. The latching element has a sliding bolt and an actuator. The actuator is utilized to transition the sliding bolt between a locked state and an unlocked state. The security device also includes a receiving element coupled to an interior surface of an element of the passageway barricade other than the moveable element, such as a door jamb or, in the case of a non-mullion double door, the other door. The receiving element receives the sliding bolt when the sliding bolt transitions to the locked state.

The various embodiments of the security device also include a safety release that is accessible from a port in an exterior surface of the moveable element of the passageway barricade. The port provides access to the actuator such that the sliding bolt can be transitioned from a locked state to an unlocked state from someone on the exterior side of the door, such as law enforcement, first responders, medics, etc.

In some embodiments, the passageway barricade is a door and the latching element is coupled to the interior surface of the door and on the hinge-side edge while the receiving element is attached to a door jamb adjacent to the hinge-side edge of the door. In such embodiments the latching element includes a pin and the receiving element includes an upper and lower barrel. In other embodiments the latching element includes a first barrel and the receiving element includes two additional barrels. In such embodiments the barrel of the latching element can be slid between the barrels of the receiving element and secured with a pin or other mechanism to create a barrel hinge structure. When the latching element is connected to the receiving element, the latching element can rotate like a hinge relative to the receiving element. Further, the pin defines an aperture passing through the pin. To transition the security device to the locked state, the sliding bolt, or a portion of the sliding bolt is slid through the aperture of the pin.

In other embodiments, the passageway barricade is a door and the latching element is coupled to the interior surface of the door on the knob-side edge while the receiving element is attached to a door jamb adjacent to the knob-side edge of the door. The receiving element includes an aperture for receiving the sliding bolt when the sliding bolt is in a locked state.

In yet other embodiments, the passageway barricade is a non-mullion double door and the latching element is coupled to the interior surface of a first door of the double door on the knob-side edge while the receiving element is attached to a second door of the non-mullion double door adjacent to the knob-side edge of the first door. Similar to the other embodiments, the receiving element includes an aperture for receiving the sliding bolt when the sliding bolt is in a locked state. Further, in this embodiment the slide bolt includes a plurality of grooves around the circumference of the slide bolt. The aperture defined by the receiving element also includes a plurality of grooves on the inner surface of the aperture that are parallel to the grooves on the slide bolt. Upon applying pressure to open the non-mullion double door, the grooves of the slide bolt and the grooves of the aperture of the receiving element engage with each other to prevent the slide bolt from exiting the aperture.

In the various embodiments, the actuator may be a rack and pinion mechanism, wherein when the pinion is rotated, a rack associated with the sliding bolt is forced to move the sliding bolt. These and other embodiments are be described in greater detail below in connection with the presentment of the various drawings of presented embodiments of the invention.

DETAILED DESCRIPTION

Various embodiments, aspects and features of the present invention encompass a security device that can be activated or deactivated by hand on the interior side of a door or window or other passageway barricade, and that can be activated or deactivated on the exterior side of the door with a special mechanism, such as a key, tool, transmitter, fob, etc. The various embodiments of the door security device may be mounted to the hinge-side of the door, the knob-side of the door, both the hinge-side and knob-side of the door, or in a scenario that includes a non-mullion double door, to the two adjoining portions of the doors at the middle joint. Further configurations and advantages and uses of the door security device will occur to those of skill in the art reviewing the figures and description that follows. While the present invention and embodiments thereof are described in terms of a door security device, it should be understood that the various embodiments of the present invention may also find use in other applications, such as windows, safe rooms, sliding doors, garage doors, trap doors, hidden doors, public restrooms, businesses, etc.

In general, an exemplary embodiment of the security device includes a sliding bar/latch and a receiver. Depending on the particular embodiment, the security device can be mounted to the interior side of a door, either on the hinge-side edge of the door or the knob-side edge of the door. The sliding bar/latch may be mounted to the surface of the door and the receiver may be mounted to the door jamb or mullion adjacent to the sliding bar/latch. In operation, when the door is in a closed position, the sliding bar/latch can be actuated to cause the bar to slide into the receiver and thus secure the door into the locked position. The back side of the sliding bar/latch includes an actuator interface that can be used to activate or deactivate the sliding bar/latch. An aperture is created through the door to give access to this actuator interface from the exterior side of the door. To prevent the security device from being rendered useless or easily unlocked, a special tool or electronic signal is required to control the interface of the sliding bar/latch externally through the aperture. Further details, aspects, and operations of the various embodiments of the security device will be presented below in connection with the description of the drawings, in which like labels represent like elements throughout the various view.

Figure 1A:
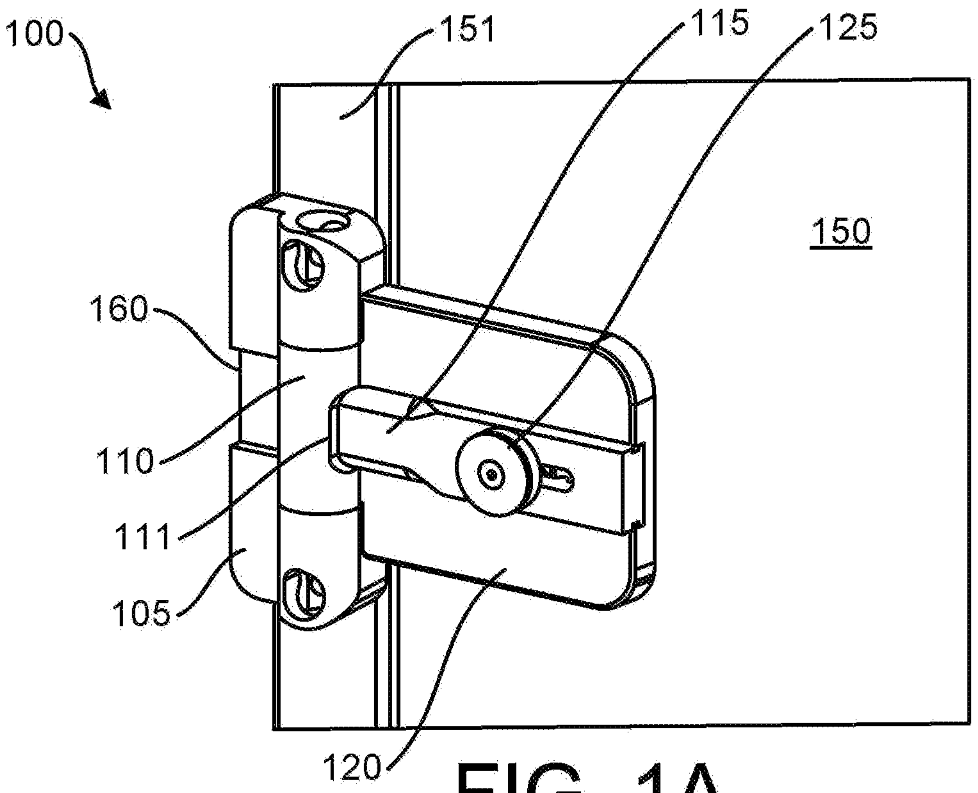
FIG. 1A is a conceptual diagram of an exemplary embodiment of a door security device in an unlocked state.

FIG. 1A is a conceptual diagram of an exemplary embodiment of a door security device in an unlocked state. The illustrated embodiment is for mounting on the hinge-side edge of the interior surface of a door and the interior door jamb adjacent to the hinge-side edge of the door. As can be understood from the illustration, the solution is based on a pin and barrel design. The door security device 100 includes a receiver or barrel component 105 that is securely mounted to the interior surface of a door jamb/casing 151 that is adjacent or proximate to the hinge-side edge of the door. In many applications, such as in schools and commercial buildings, the jamb/casing 151 may be comprised of steel but, other materials such as wood, wood and sheetrock, etc. may also receive the barrel component 105. A latch assembly 122 includes a barrel/pin component 110 that is rotatably coupled to the barrel component 105 such that the security device 100 may swing or hinge between an open position and a closed position, similar to a barrel hinge, as would be understood by one of ordinary skill in the art. Advantageously, this embodiment of the door security device can also operate as a hinge for the door. Multiple door security devices can be installed in addition to or in lieu of regular hinges.

Figure 1B:
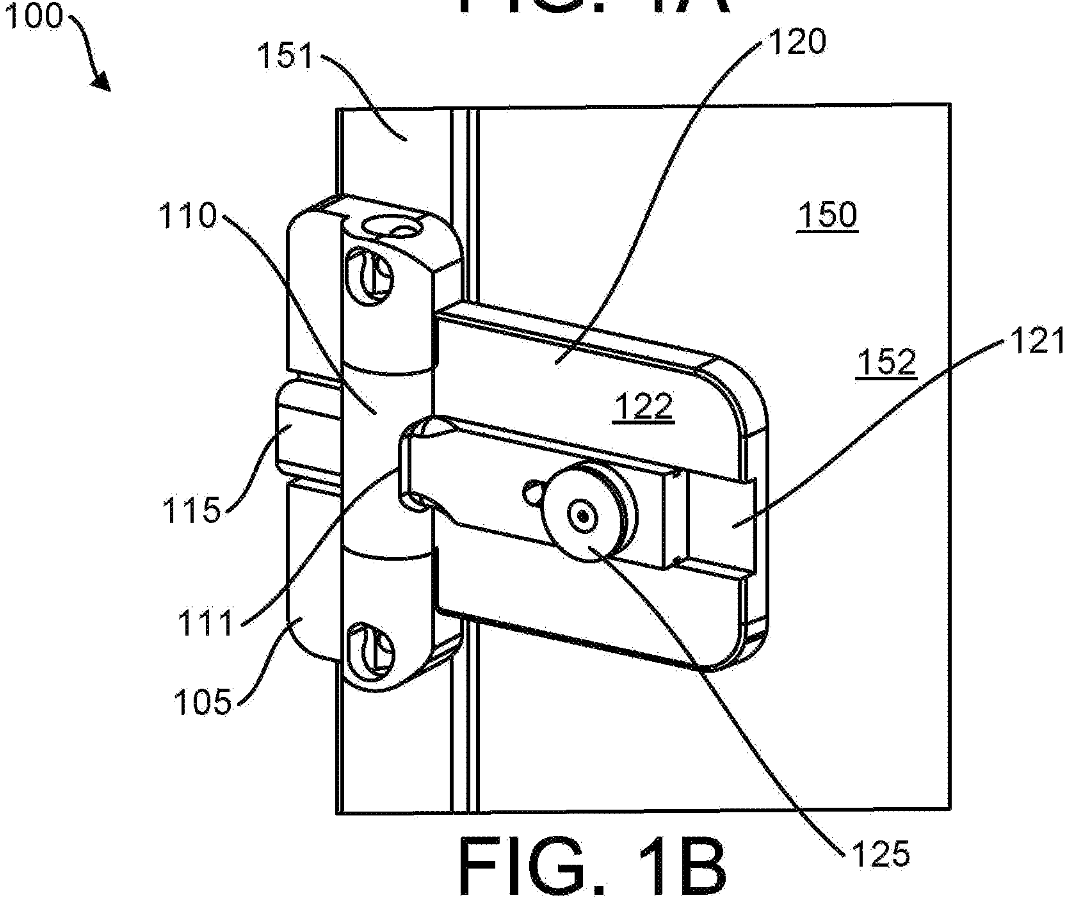
FIG. 1B is a conceptual diagram of the exemplary embodiment of a door security device of FIG. 1A in an locked state.

The latch assembly 122 includes a leaf plate 120 that extends from the barrel/pin component 110 and is configured to be mounted or attached to the interior surface 152 of a door 150. A slide bolt 115 is slidably engaged within a channel 121 in the leaf plate 120. An actuator is utilized to move the slide bolt 115 from an unlocked position (FIG. 1A) to a locked position (FIG. 1B). One embodiment for the slide bolt 115 actuator may be a rack and roller pinion actuator 125 (as described further in connection with FIG. 2). For example, the roller pinion engages with a rack that is interior to the slide bolt 115.

FIG. 1B is a conceptual diagram of the exemplary embodiment of the door security device of FIG. 1A in a locked state. When the slide bolt 115 is in the unlocked position (see FIG. 1A), the security device 100 and the door 150 can be opened. When the door is opened, the barrel/pin 110 rotates between the barrels of the barrel component 105 as the door swings open and closed, just like a hinge would operate. When the slide bolt 115 is moved to the locked position (see FIG. 1B) a portion of the slide bolt 115 is passed through an aperture 111 of the barrel/pin 110 and extends out the other side. The underside of the slide bolt 115 rests against a surface 160 in a receiver element of the barrel component 105 that aligns with channel 121. In this state, the door 150 is prevented from opening because a portion of the slide bolt 115 is extended over the surface of the leaf plate 120 in the channel 121, and another portion of the slide bolt 115 extends over the surface 160 of the barrel component 105. When an attempt is made to open the door 150, the portion of the slide bolt 115 that is extended over the surface 160 of the barrel component prevents the pin 110 from rotating, thus preventing the door from opening.

It should be appreciated that tremendous pressure may exist at the interface of the slide bolt 115 and the barrel component 105. As such, the securing device should be constructed of a rugged material that can withstand such forces or pressure. In addition, the length of the slide bolt can be adjusted to help distribute the force across a larger surface area. For instance, the surface 160 of the barrel component 105 may be several inches long and the slide bolt may extend from the jamb 151 to several inches past over the door 150, or even to or past a halfway point of the door 150. In addition, the thickness of the slide bolt can be increased to provide further strength as well as the thickness and material of the barrel/pin 110.

Figure 2:
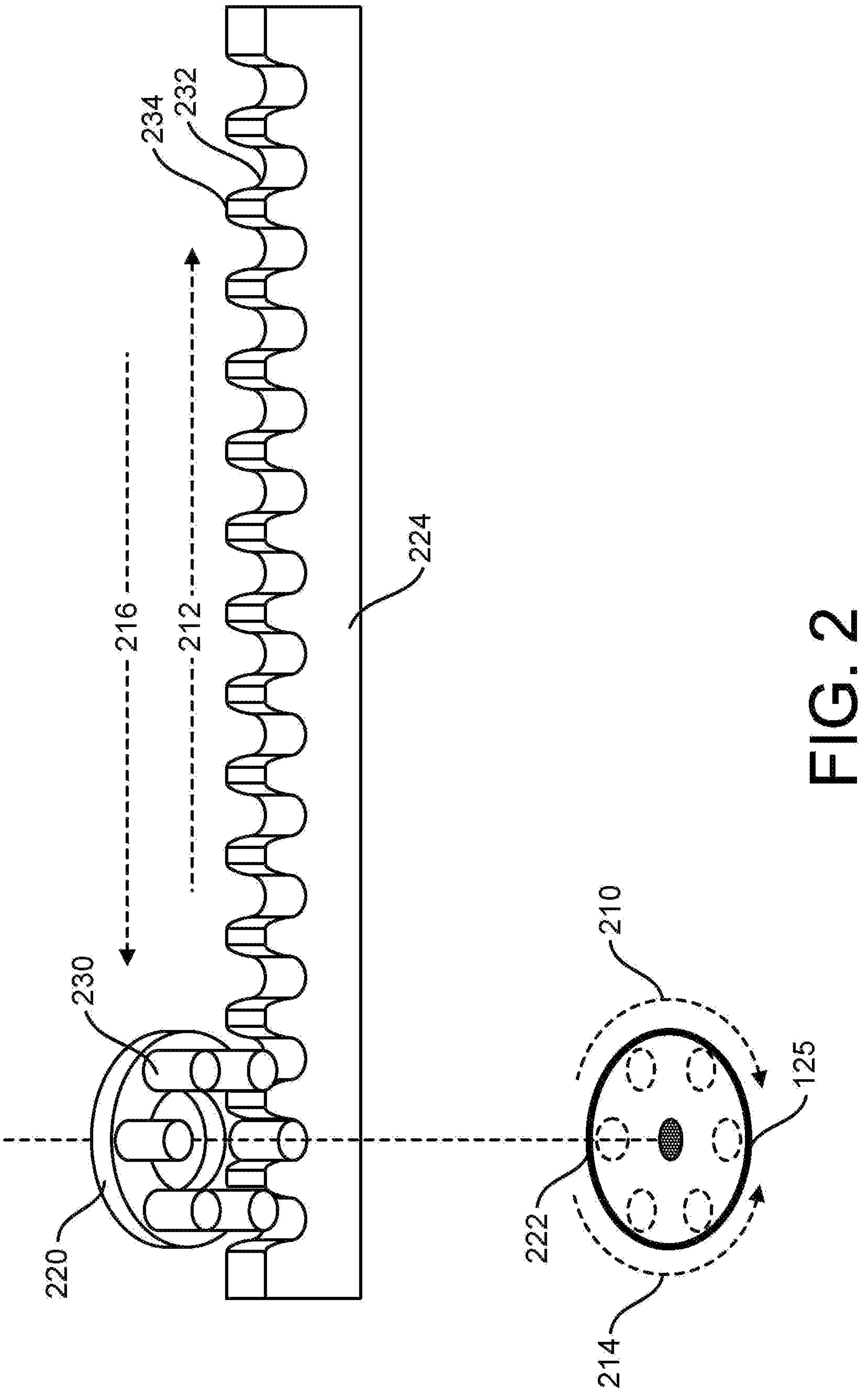
FIG. 2 is a conceptual diagram of a rack and pinion style drive that can be used for extending or retracting the exemplary embodiment of the security door-hinge device between the unlocked state of FIG. 1A and the locked state of FIG. 1B.

FIG. 2 is a conceptual diagram of a rack and pinion style drive that can be used for extending or retracting the exemplary embodiment of the security door-hinge device FIG. 1A. Actuation of the roller pinion actuator 125 operates to extend or retract the slide bolt 115 relative to an aperture 111 of the pin component 110. The roller pinion actuator 125 is illustrated as including a round gear 220 with a front knob 222 being accessible to a user. The round gear 220 engages with a linear gear (the rack) 224. The front knob 222 may include grooves around the outer side edge to help a user grip the actuator when actuating the roller pinion actuator 125. The round gear 220 includes a plurality of cogs 230 that fit inside the grooves 232 between the cogs 234 of the rack 224. In operation, a user may grip the front knob 222 of the roller pinion actuator 125 and turn it in a clockwise direction 210. Rotating the front knob 222 in the clockwise direction 210 causes the rack 224 to move in direction 216 as the cogs of the round gear 220 engage with the cogs 234 of the rack 224. With the rack 224 being physically connected or integral to the sliding latch 115, this forces the sliding latch 115 to move in the same direction, which as shown in the orientation of the door security device 100 changing from the state in FIG. 1A to the state in FIG. 1B by causing the sliding latch 115 to traverse through the aperture 111 of the pin component 110 and thus, secure the door in a locked position by preventing the barrel/pin 110 from rotating relative to the barrel 105.

Rotating the front knob 222 in the counterclockwise direction 214 causes the rack 224 to move in direction 212 as the cogs of the round gear 220 engage with the cogs 234 of the rack 224. This forces the sliding latch 115 to move in the same direction, which as shown in the orientation of the door security device 100 changing from the state in FIG. 1B to the state in FIG. 1A by causing the sliding latch 115 to traverse out of the aperture 111 of the pin component 110 and thus, return the door to the unlocked position and allowing the barrel/pin 110 to rotate relative to the barrel 105.

With the slide bolt 115 in a retracted state (such as in FIG. 1A), the door 150 may be freely opened as the leaf plate 120 is allowed to rotate with the barrel/pin component 110. By contrast, with the slide bolt 115 in an extended state (such as in FIG. 1B), the slide bolt 115 extends through aperture 111 such that rotation of the barrel/pin 110 is prevented. Advantageously, with rotation of the pin component 110 prevented by the extended slide bolt 115, the leaf plate 120 that is coupled or integral to the surface 152 of the door 150 and the inability of the barrel/pin 110 to rotate operate to prevent the door 150 from being opened.

While FIG. 2 and other figures throughout illustrated the actuator 125 as being a wheel or disc that can be turned, it should be appreciated that other mechanisms may be utilized. For instance, a captain's wheel configuration, such as can be found on some safes may be used. Further, a latch can be used and swinging the latch from a closed to an open position may quickly cause the rack and pinion to traverse from an unlocked to a locked state.

Figure 3A:
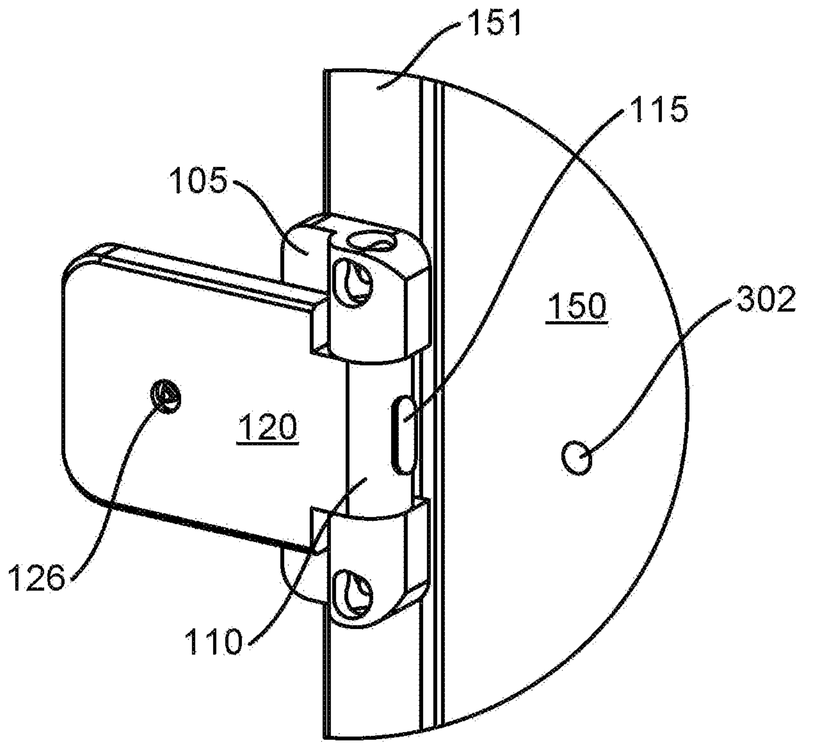
FIG. 3A is a conceptual diagram of the exemplary embodiment of the security door-hinge device of FIG. 1A, shown mounted to a door jamb, but not yet mounted to a door, and residing in an unlocked state.

FIG. 3A is a conceptual diagram of the exemplary embodiment of the security door-hinge device of FIG. 1A, shown mounted to a door jamb, but not yet mounted to a door, and residing in an unlocked state. This diagram illustrates the barrel component 105 being mounted or secured to the jamb 151 but the leaf plate 120 is not yet secured to the door 150. In this illustration, an aperture 302 through the door 150 can be seen. Adding to that which has already been described relative to FIGS. 1A-1B, it can be seen in the FIG. 3A illustration that the rack and pinion actuator is accessible or can be operated through a port 126 on the door-side surface of the leaf plate 120. In this way, the rack and pinion may be accessed and actuated to retract the slide bolt 115 by engaging the rack and pinion through the aperture 302 positioned in the door 150. It is envisioned that the rack and pinion may be engaged through hole 302 using a specialized key or, in some embodiments, by an electronic code-actuated actuator (such as may be used on residential gun safes or the like) mounted on the exterior of the door and over the hole 302, as would be understood by one of ordinary skill in the art.

Figure 3B:
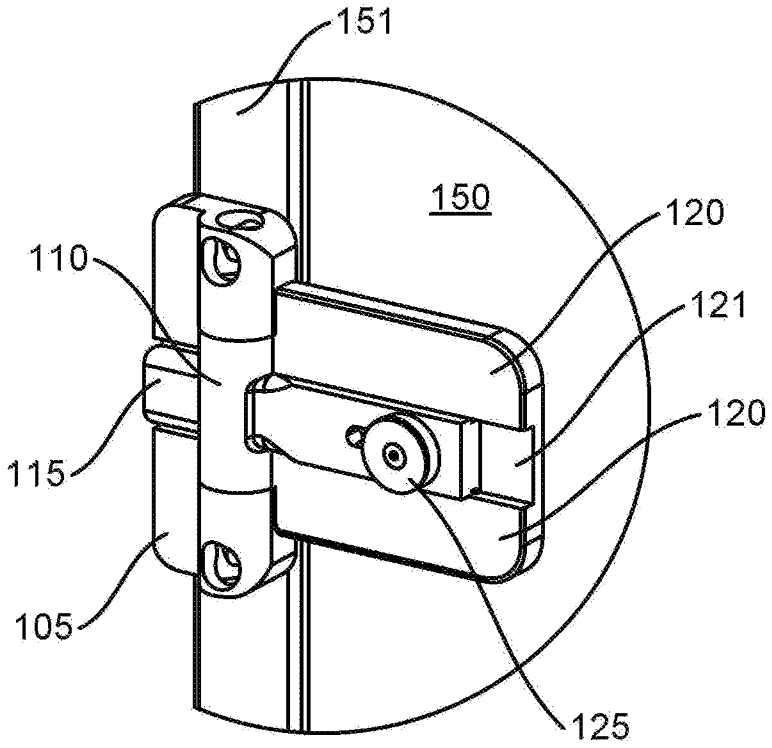
FIG. 3B is a conceptual diagram of the exemplary embodiment of the security door-hinge device of FIG. 1A, shown mounted to a door jamb and to a closed door, and residing in a locked state.

FIG. 3B is a conceptual diagram of the exemplary embodiment of the security door-hinge device of FIG. 1A, shown mounted to a door jamb and to a closed door, and residing in a locked state. In this illustration, the leaf plate 120 is shown as being extended and coupled to the door 150. In this configuration, the rack and pinion actuator 125 can be utilized to move the slide bolt 115 between the locked and unlocked position. Likewise, a special key, tool, fob or other mechanism may be utilized on the exterior of the door 150, through aperture 302 and port 126 to also move the slide bolt 115 between the locked and unlocked position.

It should be appreciated that the rack and pinion embodiment for the slide bolt 115 actuator is just an exemplary solution and other solutions may also be employed in various embodiments of the present invention. For instance, a spring lock mechanism may be used. In this embodiment a spring is used to bias the slide bolt 115 into an unlocked position. To lock the door, the slide bolt 115 can be manually slid to the locked position and a spring loaded stop may then trigger in the channel 121 to prevent the slide bolt 115 from springing back to the unlocked position. In such an embodiment, the port 126 may then be used to access the spring loaded stop such that it is moved or retracted out of the channel 121 path, thus allowing the spring bias of the slide bolt 115 to force the slide bolt 115 back into an unlocked position. In yet another embodiment, the actuator 125 may be a lock pin and the slide bolt 115 may be spring biased into the unlocked position. When a user slides the slide bolt to the locked position, the lock pin actuator 125 would be aligned with the port and thus, the user can press the lock pin actuator 125 such that a lock pin extends through the port 126 and thus prevents the spring bias of the slide bolt 115 from forcing the slide bolt back to the unlocked position. A user may then retract the lock pin actuator 125 to unlock the door or, a tool can be utilized from the exterior to do the same through the aperture 302.

Figure 4A:
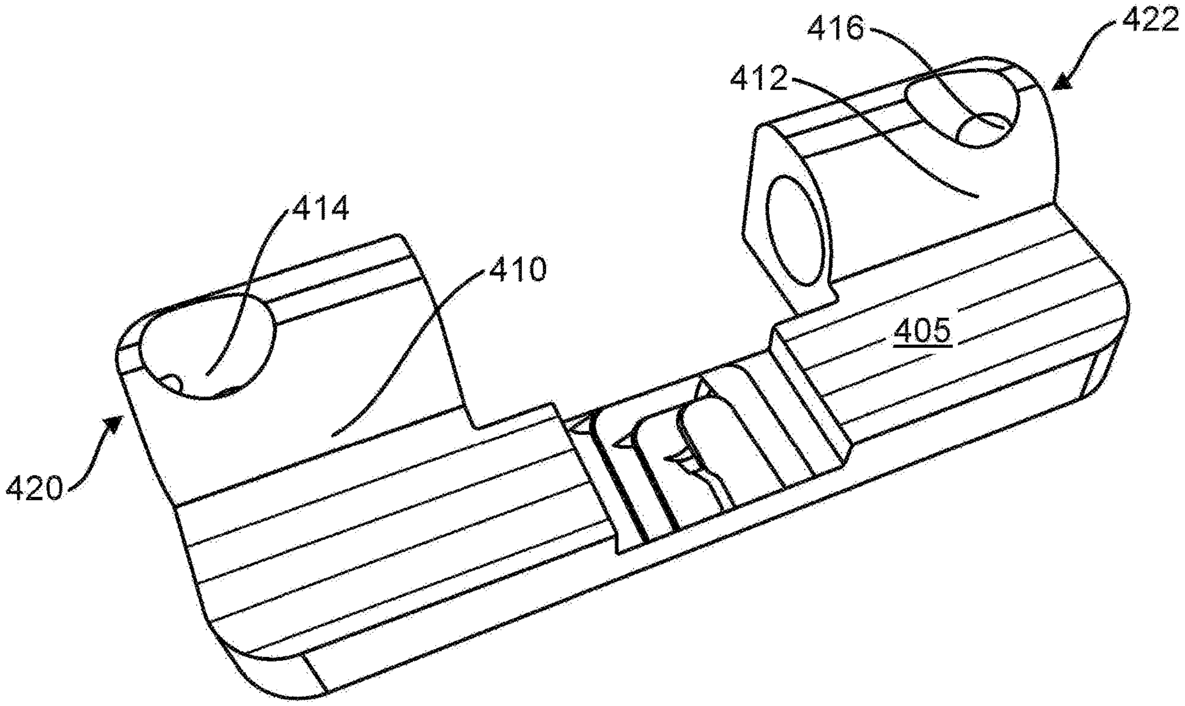
FIG. 4A is a first perspective view of the jamb mount portion, receiver or barrel component of the exemplary embodiment of the security door device of FIG. 1A and FIG. 1B.
Figure 4B:
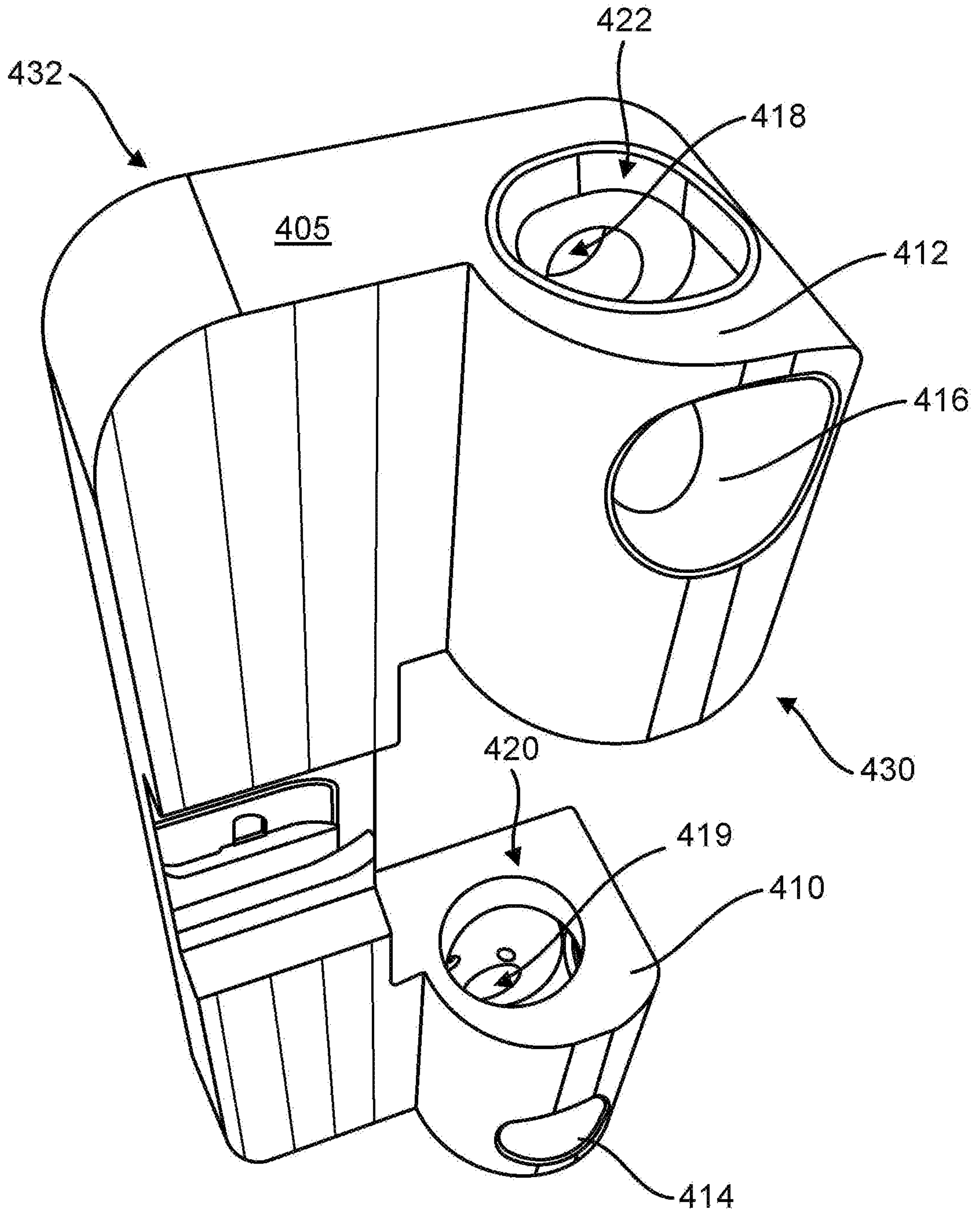
FIG. 4B is a second perspective view of the jamb mount portion of the exemplary embodiment of the security door device of FIG. 1A and FIG. 1B.

FIG. 4A is a first perspective view of the jamb mount portion or barrel component of the exemplary embodiment of the security door device FIG. 1A. FIG. 4B is a second perspective view of the jamb mount portion of the exemplary embodiment of the security door device FIG. 1A. The barrel component 405 could be utilized in the exemplary embodiment illustrated in FIG. 1A and FIG. 1B. The barrel component is illustrated as including two cylindrical-type barrel shapes. Barrel 410 is located on the lower side of the barrel component 405 and barrel 412 is located on the upper side of the barrel component 405. Both the lower barrel 410 and the upper barrel 412 include a hollowed-out center 420 and 422 respectively. The hollowed-out center 422 of the upper barrel 412 passes completely through the upper barrel 412. The hollowed-out center 420 of the lower barrel 410 may pass all the way through the lower barrel 410 in some embodiments and in other embodiments the lower barrel 410 may define a bottom such that the hollowed out center 420 only passes through the majority of the lower barrel 410.

The lower barrel 410 and the upper barrel 412 include mounting apertures 414 and 416 respectively. As best seen in FIG. 4B and with respect to the upper barrel 412, the mounting aperture 416 extends through the entire barrel and thus the aperture 416 is visible on the front face 430 of the barrel component 405 and then aperture 418 is shown as passing through the mounting side face 432 of the barrel component 405. The apertures 416 and 418 provide a path through the upper barrel 412 from the front face 430 to the mounting side face 432. A similar structure is provided for lower barrel 410 with aperture 414 and 419.

To mount the barrel component 405 to a door jamb, the barrel component 405 is held in place and a fastening device can be passed through aperture 416 and aperture 418 and then attached onto or into and through the doorjamb. It will be appreciated that apertures 418 and 419 is smaller in diameter than apertures 416 and 414 thus allowing the head of the connector, such as a screw, bolt, nail, etc., to pass through apertures 416 and 414 but not through apertures 418 and 419, thus holding the barrel component 405 against the jamb. It should also be appreciated that the apertures 418 and 419 may be tapered or indented such that the head of the connecting device can be set below the interior surface of the hollowed-out centers 420 and 422.

Figure 5:
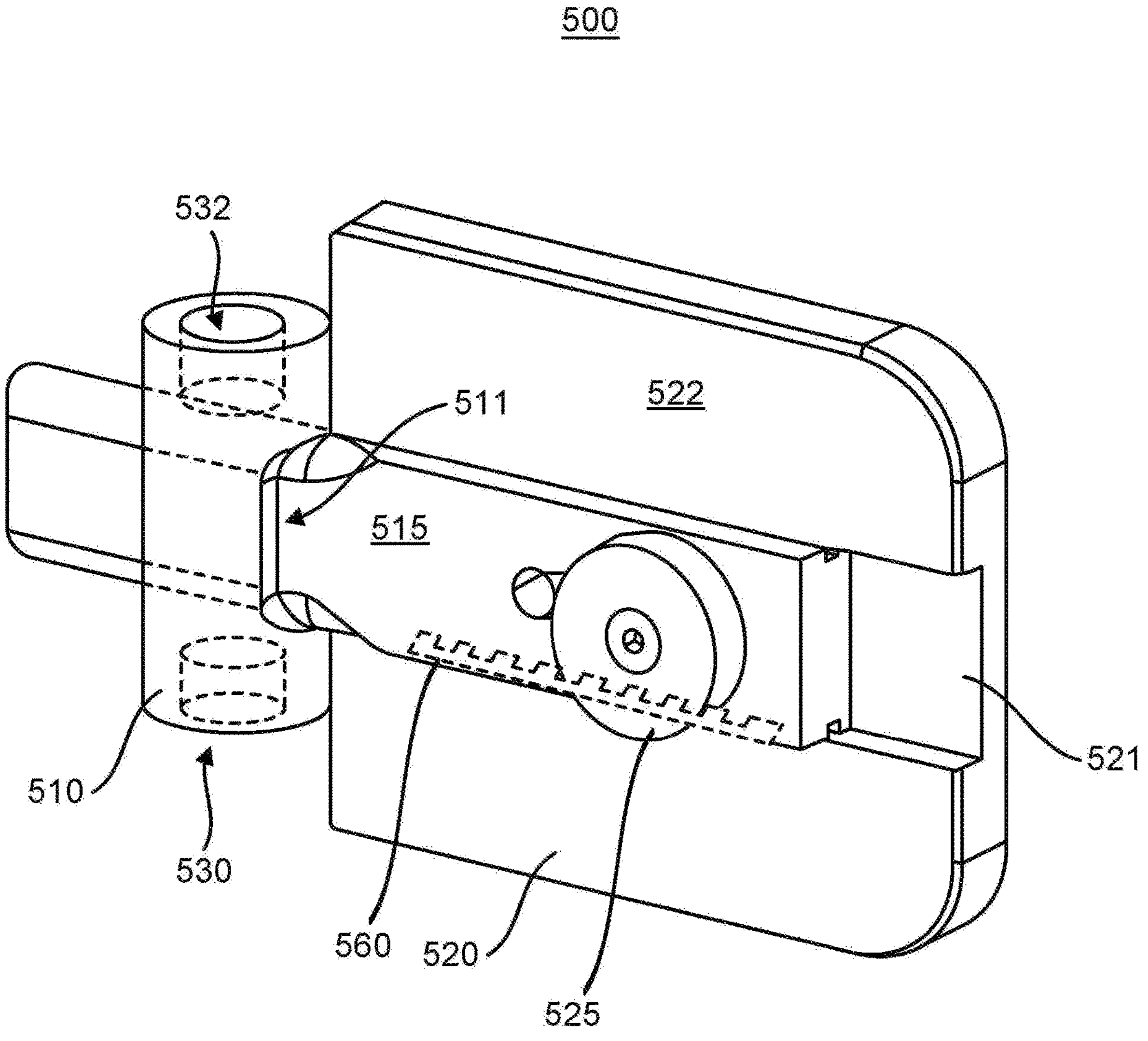
FIG. 5 is a perspective view of the door mount portion or the latch assembly and pin component of the exemplary embodiment of the security door device of FIG. 1A and FIG. 1B.

FIG. 5 is a perspective view of the door mount portion or the latch assembly and barrel/pin component of the exemplary embodiment of the security door device FIG. 1A. The door mount portion 500 includes the pin component 510 and the latch assembly 522. The latch assembly 522 includes a leaf plate 520 that extends from the pin component 510 and is configured to be mounted or attached to the interior surface of a door. The latch assembly 522 also includes the slide bolt 515, which is moveably engaged within a channel 521 in the leaf plate 520. An actuator 525 is utilized to move the slide bolt 515 from an unlocked position to a locked position by using a structure, such as a rack and pinion. A rack 560 is illustrated as being internal to the slide bolt 515. The pinion 525 engages with the rack 560 such that when the pinion 525 is rotated, the slide bolt 515 moves between an engaged and disengaged position.

The pin component 510 is illustrated as including an aperture 511 to allow the slide bolt 515 to pass through it and thus lock the pin component 510 and the barrel component (405 in FIG. 4A and FIG. 4B) into position to secure a door.

The pin component 510 mounts between the upper barrel 412 and lower barrel 410 of the barrel component 405 (FIG. 4A and FIG. 4B). The pen component 510 can be held in position using a variety of techniques. In one embodiment, two receptors 530 and 532 are defined by the pin component 510. Receptors 530 and 532 may receive a pin (not illustrated) that extends into the receptors and then out into the hollowed-out centers 420 and 422 of barrels 410 and 412 respectively of the barrel component 405. In one embodiment, the pins may be threaded and the receptors 530 and 532 may be threaded to receive the threaded pins. In another embodiment, the connecting device that is passed through apertures 414 and 416 may include an extended head that extends across the hollowed-out centers 420 and 422. In such a configuration, the pins can be inserted into the receptors 530 and 532 and then the connecting devices can be used to hold the pins in place. In yet other embodiments, the pins include a spring mechanism and may be fixedly attached within the receptors 530 and 532. To insert the pin component between barrels 410 and 412, the pins can be depressed allowing the pin component 510 to slide into position, and then the pins within the receptors 530 and 532 can pop into place, securing the pin component 405 and the latch subassembly 522 together.

Figure 6A:
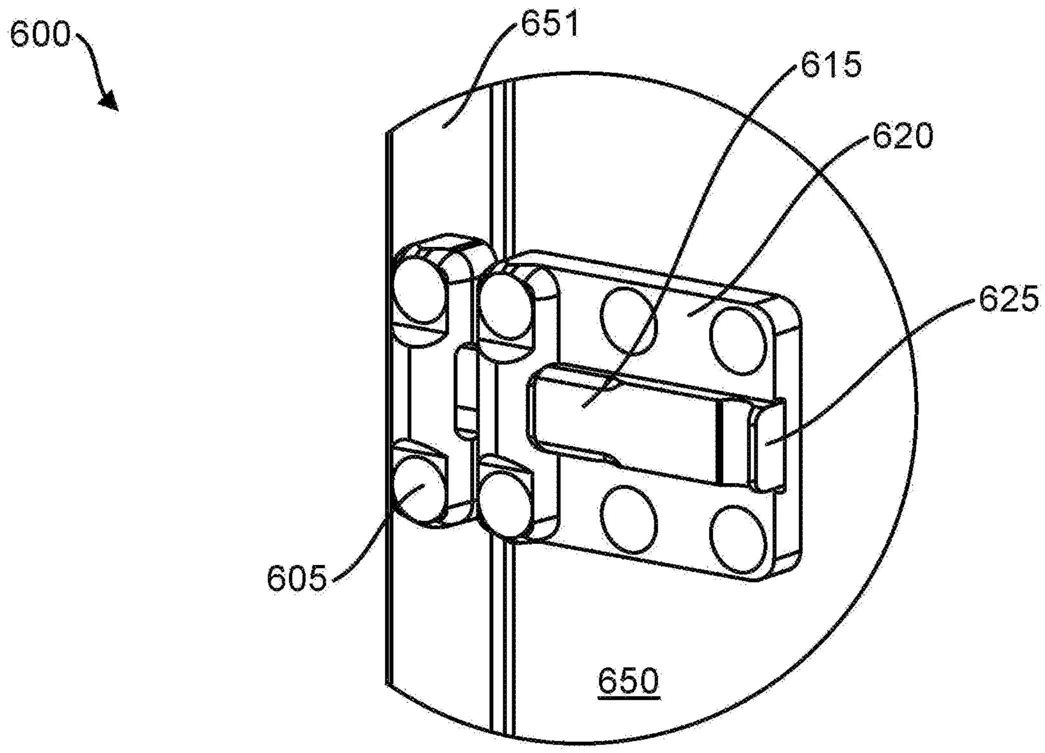
FIG. 6A is a conceptual diagram of an exemplary embodiment of a door security device that can be attached to the door on the knob-side.
Figure 6B:
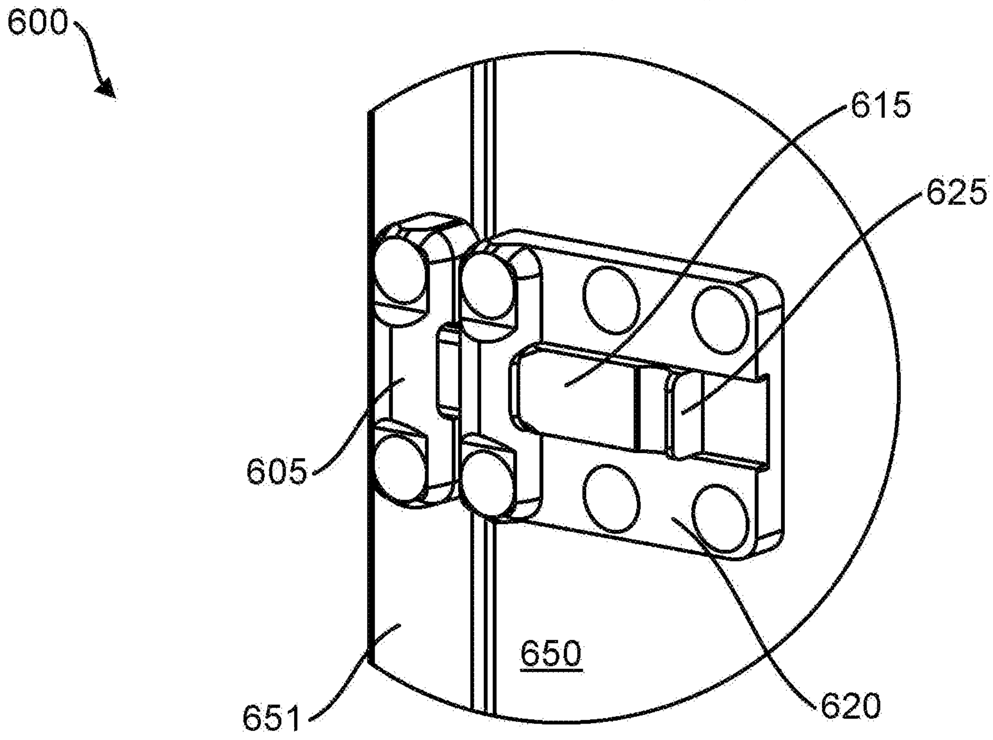
FIG. 6B is a conceptual diagram of the exemplary embodiment of the door security device of FIG. 6A as viewed from the interior side and being in a locked state.

FIG. 6A is a conceptual diagram of an exemplary embodiment of a door security device that can be attached to the door on the knob-side. The embodiment illustrated in FIG. 6A is viewed from the interior side of the door and the door security device is in an unlocked state. FIG. 6B is a conceptual diagram of the exemplary embodiment of the door security device of FIG. 6A as viewed from the interior side and being in a locked state.

Similar to the embodiment illustrated and described above relative to FIG. 1A and FIG. 1B, the knob-side embodiment comprises a receiver, such as a jamb plate 605 mounted to/through a door jamb 651. A complementary leaf plate 620 is mounted to/through the door 650. With the slide bolt 615 fully retracted via actuation of handle 625 away from jamb 651, the knob-side door security device 600 is in an unlocked state such that door 650 may be opened and closed under normal operation. Looking at FIG. 6B, the handle 625 has been moved from the unlocked position into the locked position by sliding the slide bolt 615 into a recess in the jamb plate 605, thus preventing the door 650 from being opened.

Figure 7A:
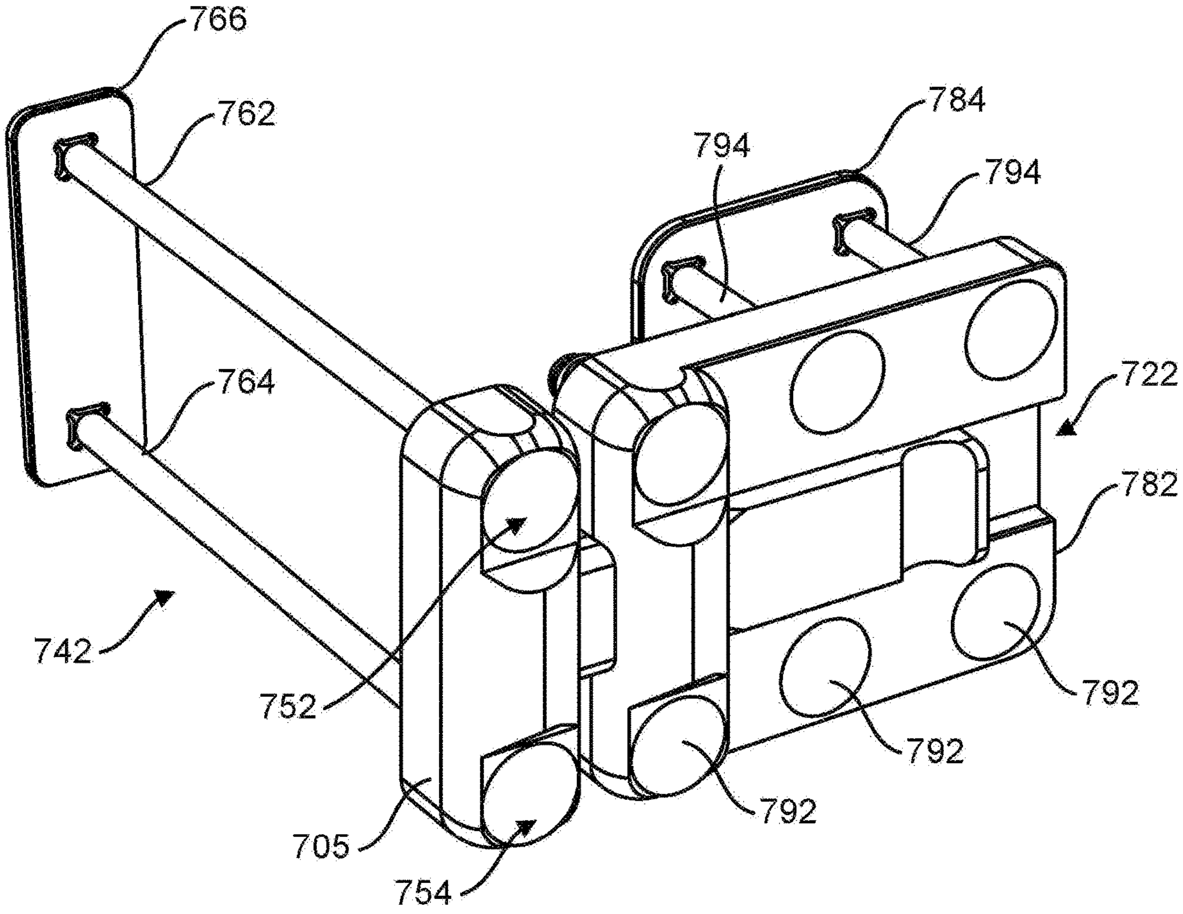
FIG. 7A is a first perspective conceptual diagram of an exemplary embodiment of the knob side door security device illustrated in FIG. 6A and FIG. 6B and illustrated as being unmounted or uninstalled on a door and jamb.
Figure 7B:
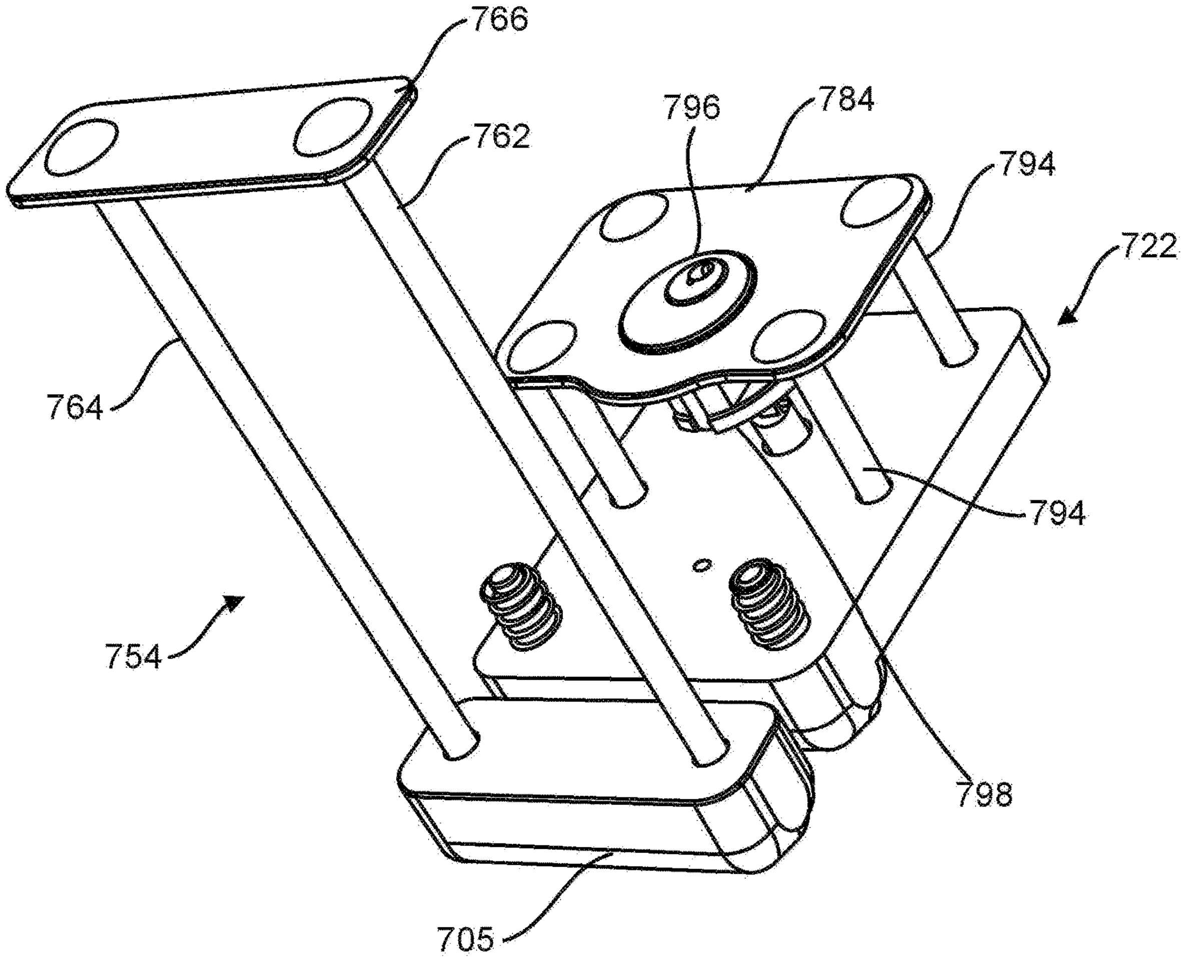
FIG. 7B is a second perspective conceptual diagram of the exemplary embodiment of the knob-side door security device illustrated in FIG. 6A and FIG. 6B and illustrated as being unmounted or uninstalled.

FIG. 7A is a first perspective conceptual diagram of an exemplary embodiment of the knob-side door security device illustrated in FIG. 6A and FIG. 6B and illustrated as being unmounted or uninstalled on a door and jamb. FIG. 7B is a second perspective conceptual diagram of the exemplary embodiment of the knob-side door security device illustrated in FIG. 6A and FIG. 6B and illustrated as being unmounted or uninstalled. Looking at FIG. 7A, the embodiment includes the jamb assembly 742 and the latch assembly 722. The jamb assembly 742 includes a jamb plate 705 that may be mounted to the interior side of the door jamb. The jamb plate 705 can be mounted by using two screws at positions 752 and 754 to mount the jamb plate 705 to a doorjamb. Alternatively, mounting rods 762 and 764, secured to mounting plate 766 maybe utilized by drilling pilot holes through the door jamb from the interior side to the exterior side. The mounting rods 762 and 764, already mounted to the mounting plate 766 can then be slid through the pilot holds and the ends of the rods 762 and 764 align with the positions 762 and 764 of the jamb plate 705. The ends of the rods 762 and 764 may be female threaded receivers and thus bolts can be screwed into the rods 762 and 764 to secure the jamb plate 705 to the door jamb by tightening the bolts such that the mounting plate 766 is pressed against the exterior side of the door jamb and the jamb plate 705 is pressed against the interior side of the door jamb. Turning to FIG. 7B, it can be seen that the ends of the rods 762 and 764 extend through the mounting plate 766 but do not include any mechanism to unscrew the rods 762 and 764 from the exterior side of the door. In other embodiments, the rods 762 and 764 may simply be welded to the opposite side of the mounting plate 766 such that they are not even visible from the exterior side of the door.

Turning back to FIG. 7A, the latch assembly 722 includes the interior mounted portion 782 and the exterior mounting plate 784. Similar to the mounting techniques described for the jamb assembly 742, the latch assembly 722 can be mounted to the interior side of a door using screws at points 792 or, multiple rods 794 may be used to mount the interior mounted portion 782 to the exterior mounting plate 784 through pilot holes drilled in the door. In FIG. 7B, the exterior mounting plate 784 for the latch assembly 722 includes a port 796. Similar to the port 126 describe in FIG. 3A, this port can be accessed from the exterior side of the door and emergency personnel may have a special tool that operates to actuate the secure door device from the outside and move the secure door device from a locked to an unlocked state. As can also be seen in FIG. 7B, the port may provide access to an electrical and/or mechanical element 798 for controlling the ability to unlock the security device from the exterior of the door. The electrical and/or mechanical element 798 may provide key, tool, code, electrical signal, etc., access to controlling the actuator for locking and unlocking the security device.

Figure 8A:
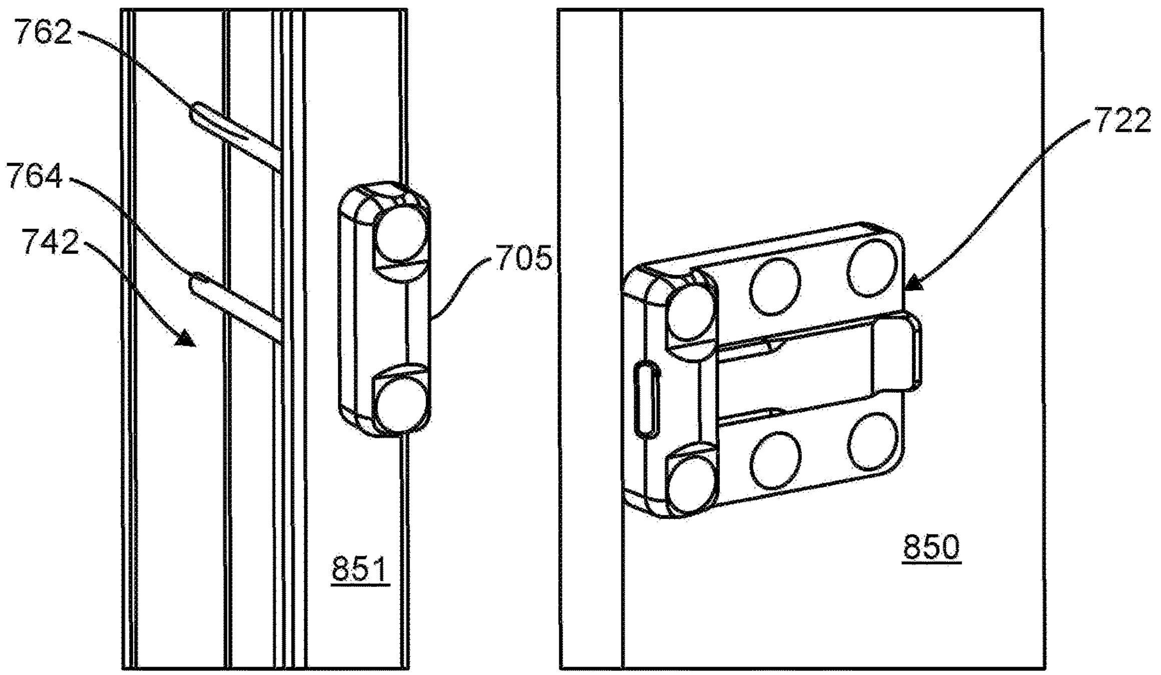
FIG. 8A is a conceptual diagram of the embodiment illustrated in FIG. 7A and FIG. 7B installed onto a door and door jamb.
Figure 8B:
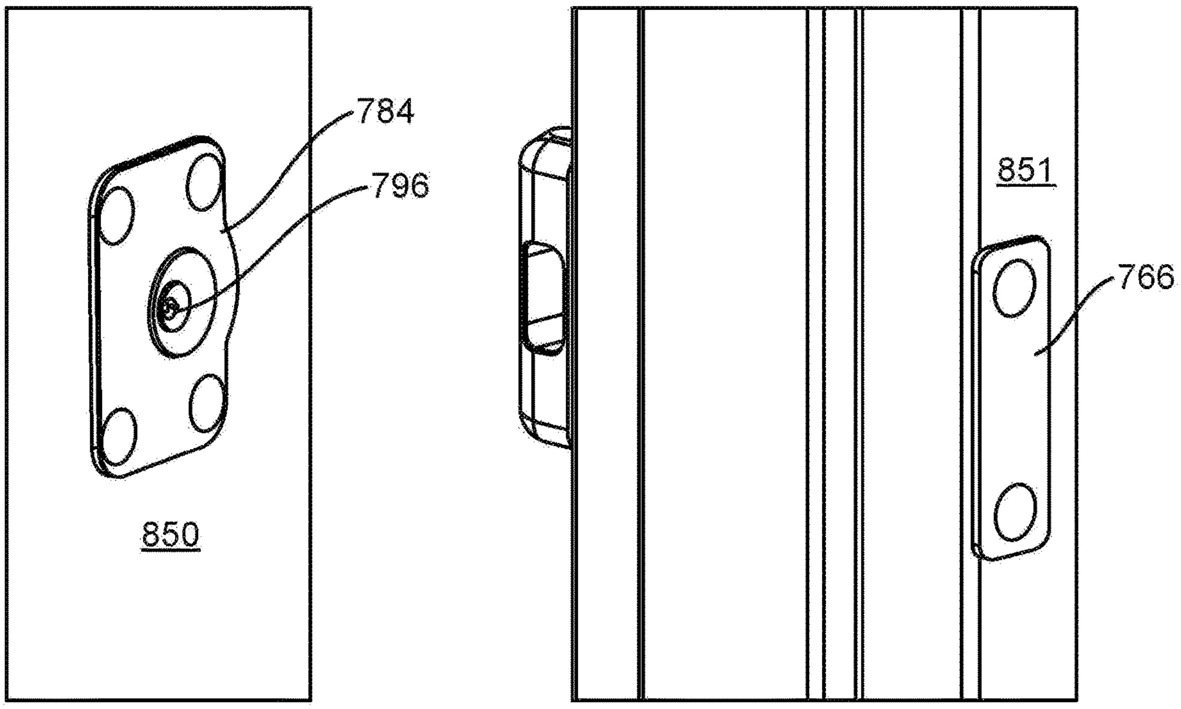
FIG. 8B illustrates the same conceptual diagram of FIG. 8A from the exterior side of the door view.

FIG. 8A is a conceptual diagram of the embodiment illustrated in FIG. 7A and FIG. 7B installed onto a door and door jamb. The latch assembly 722 is illustrated as being on the inside surface of door 850 and the jamb plate 705 is mounted to the interior side of the door jamb 851. In the illustrated embodiment rods 762 and 764 are used to secure the jamb plate 705 to the jamb 851. FIG. 8B illustrates the same conceptual diagram of FIG. 8A from the exterior side of the door view.

Figure 9A:
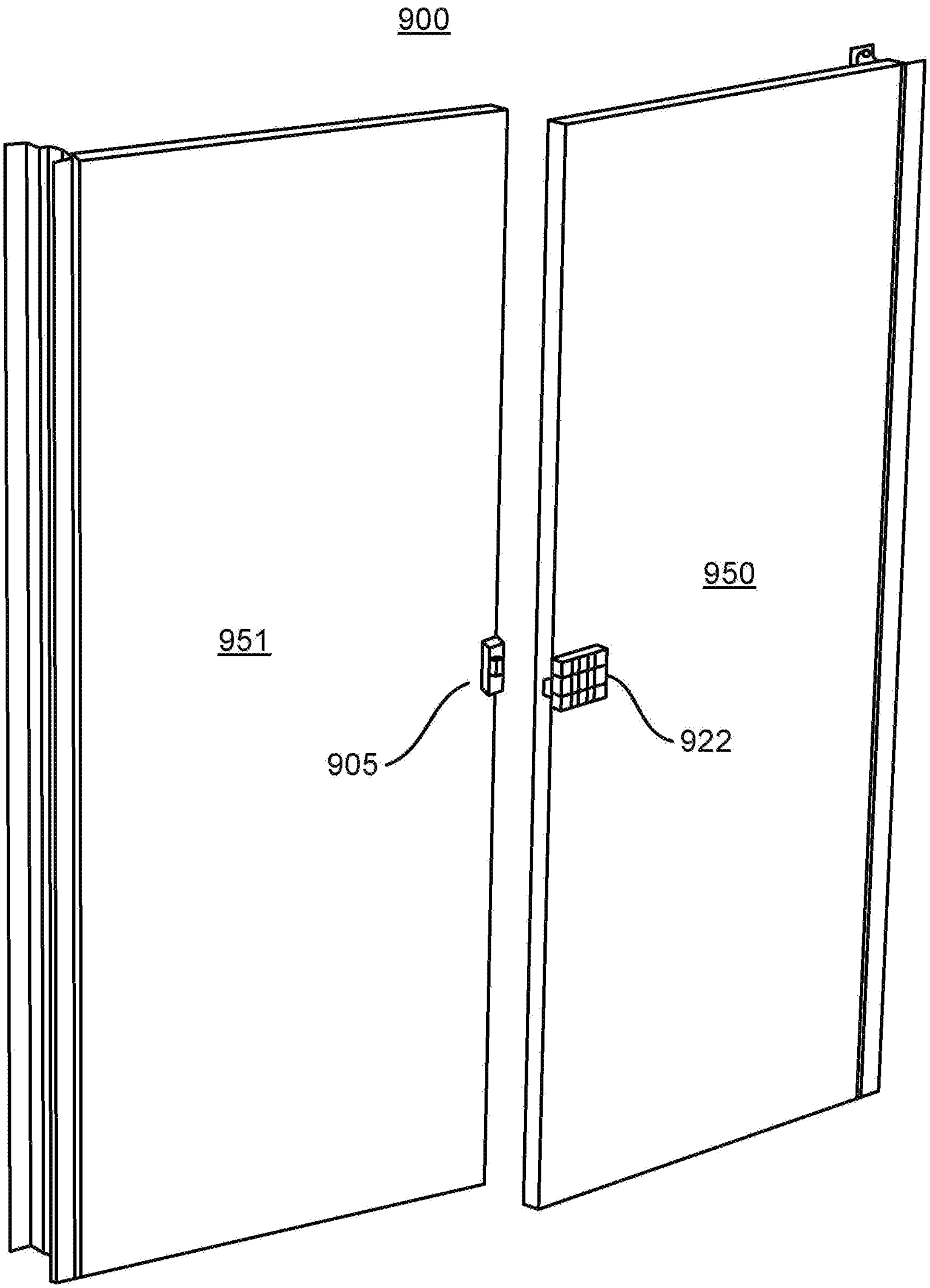
FIG. 9A is a conceptual diagram of an exemplary embodiment of the secure door device that is suitable for use on a non-mullion double door.
Figure 9B:
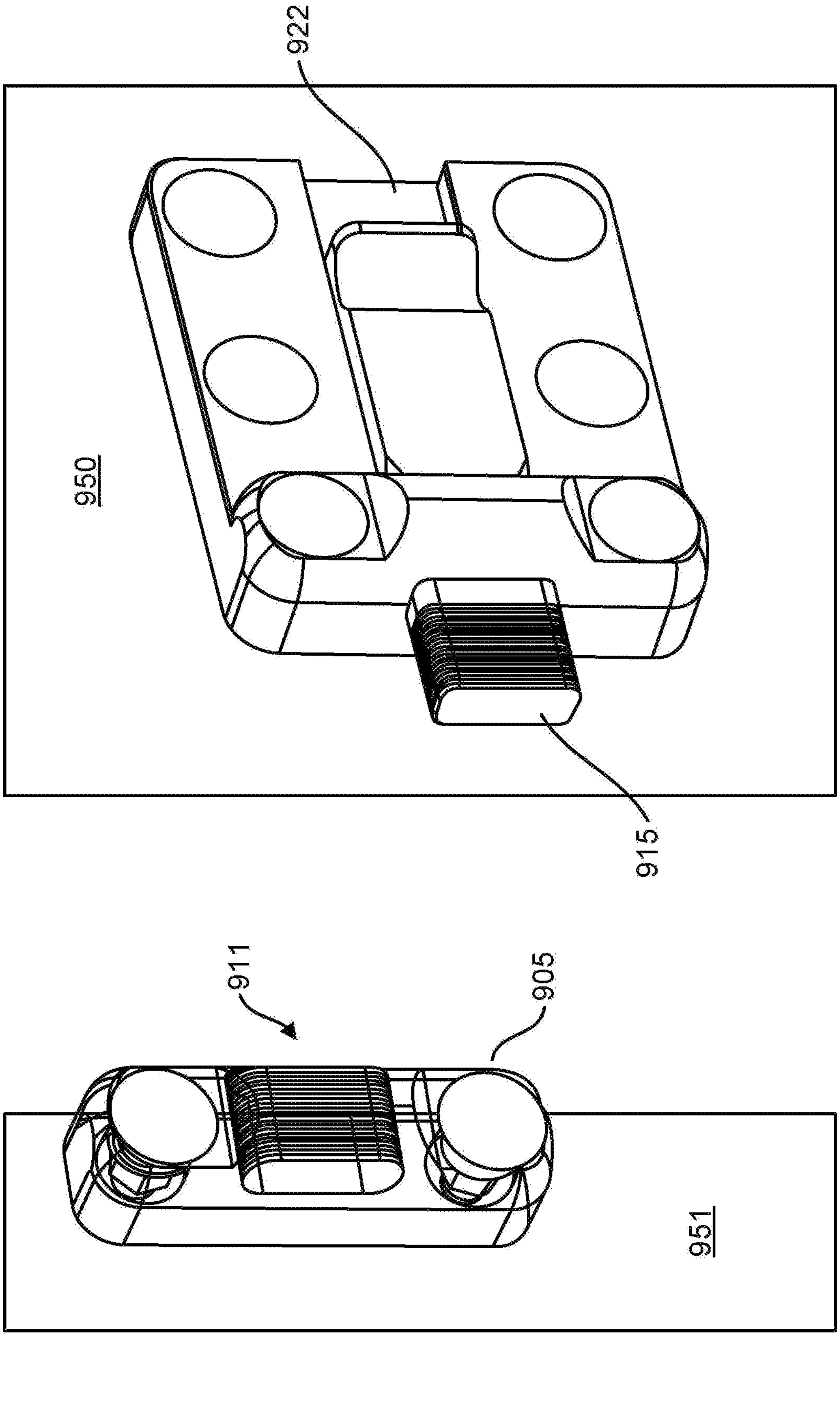
FIG. 9B is a conceptual diagram of an exemplary embodiment of the secure door device that is suitable for use on a non-mullion double door and illustrating the use of grooves in the receptor and sliding bolt.

FIG. 9A is a conceptual diagram of an exemplary embodiment of the secure door device that is suitable for use on a non-mullion double door. The exemplary embodiment 900 essentially includes the features and structures previously described relative to other embodiments. In the illustrated embodiment, a latching assembly 922 is illustrated as being mounted to one door 950, and a jamb assembly 905 is illustrated as being mounted to the other door 951. As those skilled in the art will appreciate, it can be problematic to latch double doors together when a mullion is not utilized to secure the doors shut. FIG. 9B is a conceptual diagram of an exemplary embodiment of the secure door device that is suitable for use on a non-mullion double door and illustrating the use of grooves in the receptor and sliding bolt. For instance, with a typical sliding bolt, the doors can be pushed open and the sliding bolt on one door simply slides out of the receiving receptacle on the other door. In addressing this problem in the art, the end of the sliding bolt 915 includes a plurality of grooves or threads and the receptor 911 also includes a plurality of grooves or threads. Notably, the exemplary embodiment 900 further thus includes a slide bolt 915 with a grooved or serrated surface. The grooves are applied to the end of the slide bolt 915 in a circumferential arrangement, as can be understood best by referring to FIG. 9B. Advantageously, the aperture or receptor 911 features complementary grooves circumferentially featured in its walls. The result is that when the slide bolt 915 is engaged into aperture 911, the respective grooves of the bolt 915 and aperture 911 engage or lock together when a separating force is applied to the non-mullion double doors 850, 851 (see FIG. 9C). With the grooves of aperture 911 and slide bolt 915 engaged, an increased separating force applied to the doors 950, 951 only promotes further engagement of the complementary grooves.

Figure 9C:
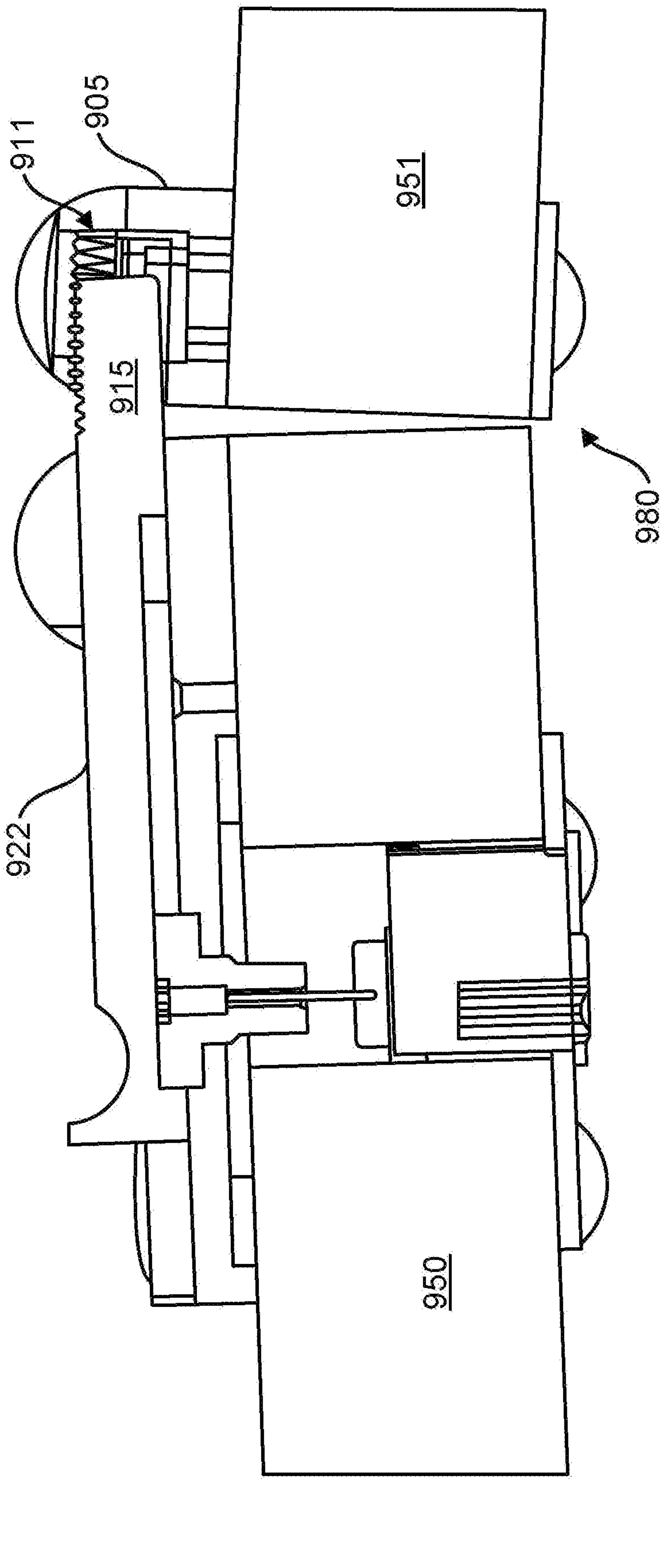
FIG. 9C is a conceptual diagram illustrating the operation of the grooves or threads in the sliding bolt 915 and the aperture 911.

In operation, when the door 950 is moved to a closed position, the sliding bolt 915 aligns with the aperture 911 of the jamb plate 905. Once the sliding bolt 915 is engaged or moved to the locked position, the groves of the sliding bolt 915 are inside the aperture 911. FIG. 9C is a conceptual diagram illustrating the operation of the grooves or threads in the sliding bolt 915 and the aperture 911. As can be best seen in FIG. 9C, once the sliding bolt 915 is set to the locked position, the grooves of the sliding bolt 915 are within the receptor 911. If pressure is applied to the double door in the direction of 980, the grooves on the sliding bolt 915 engage with the grooves on the interior surface of the receptor 911 and thus prevent the sliding bolt 915 from sliding out of the receptor 911.

In other embodiments, rather than grooves or serrations, the sliding bolt may include one or more hook shaped protrusions on the end and the receptor may include mating flanges. In normal operation, the sliding bolt and the hooks may slide into and out of the receptor, sliding past the mating flanges. However, if the door is pushed slightly open, causing the slide bolt to be at an angle (similar to what can be seen in FIG. 9C), then the hook(s) on the sliding bolt will not be able to slide past the flanges in the receptor, thus preventing the door from being opened.

Figure 10:
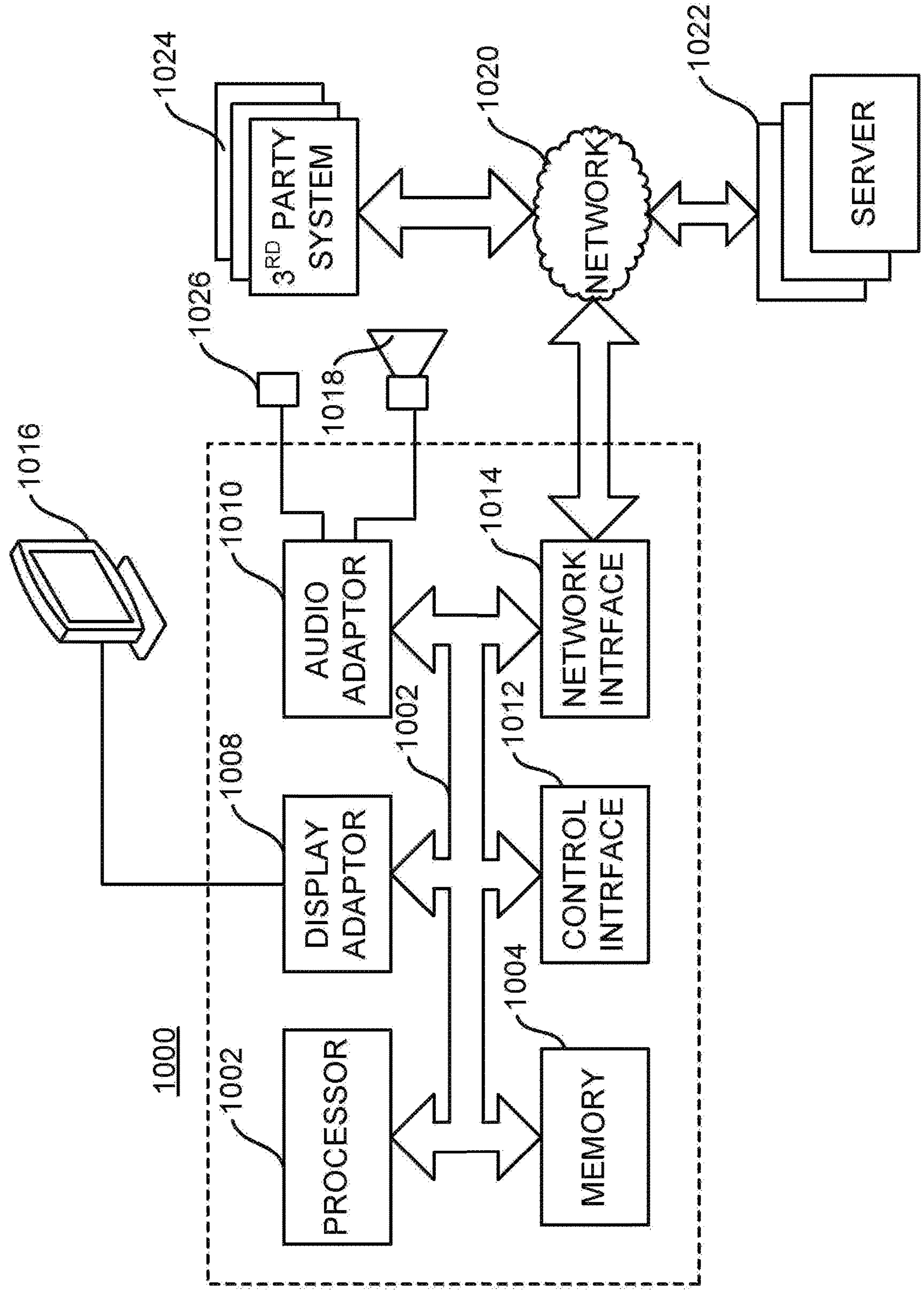
FIG. 10 is a functional block diagram of the components of an exemplary embodiment of system or sub-system operating as a controller or processor 1000 that could be used in various embodiments of the disclosure for controlling aspects or features of the various embodiments.

In some of the described embodiments and other embodiments, electronic circuitry may be required. For instance, if the actuation of the slide bolt between a locked state and unlocked state is automated, a processor and various electric components, such as a step motor, etc., may be used to implement the automation. Thus, in a school setting, a system controller may be actuated to cause one or multiple doors to transition to the locked state. Sensors may also be deployed to verify that the doors are closed before actuating the transition to the locked state. Likewise, if an electronic control on the external side of the door is utilized to unlock the door, a processor and other components may also be required. FIG. 10 is a functional block diagram of the components of an exemplary embodiment of system or sub-system operating as a controller or processor 1000 that could be used in various embodiments of the disclosure for controlling aspects or features of the various embodiments. It will be appreciated that not all of the components illustrated in FIG. 10 are required in all embodiments of the activity monitor but, each of the components are presented and described in conjunction with FIG. 10 to provide a complete and overall understanding of the components. The controller can include a general computing platform 1000 illustrated as including a processor/memory device 1002/1004 that may be integrated with each other or, communicatively connected over a bus or similar interface 1006. The processor 1002 can be a variety of processor types including microprocessors, micro-controllers, programmable arrays, custom IC's etc. and may also include single or multiple processors with or without accelerators or the like. The memory element of 1004 may include a variety of structures, including but not limited to RAM, ROM, magnetic media, optical media, bubble memory, FLASH memory, EPROM, EEPROM, etc. The processor 1002, or other components in the controller may also provide components such as a real-time clock, analog to digital convertors, digital to analog convertors, etc. The processor 1002 also interfaces to a variety of elements including a control interface 1012, a display adapter 1008, an audio adapter 1010, and network/device interface 1014. The control interface 1012 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 1008 can be used to drive a variety of alert elements 1016, such as display devices including an LED display, LCD display, one or more LEDs or other display devices. The audio adapter 1010 interfaces to and drives another alert element 1018, such as a speaker or speaker system, buzzer, bell, etc. The network/interface 1014 may interface to a network 1020 which may be any type of network including, but not limited to the Internet, a global network, a wide area network, a local area network, a wired network, a wireless network or any other network type including hybrids. Through the network 1020, or even directly, the controller 1000 can interface to other devices or computing platforms such as one or more servers 1022 and/or third-party systems 1024. A battery or power source provides power for the controller 1000.

As previously described, the various embodiments of the secure door device operate to provide security to the parties that are on the interior side of the door or other opening. However, as presented above, there can be circumstances where the secured parties need to be accessed by rescue personnel, parents, guardians or other care takers. The security of the parties on the interior is important but if the parties cannot be accessed when necessary, the security may end up being to their detriment. As such, the various embodiments of the secure door device provide an emergency access procedure or mechanism that enables rescue personnel, parents, guardians or other care takers to unlock the door and gain access to the parties. As those skilled in the art can appreciate, a physical key or electronic key are generally accepted techniques to restrict access to the interior of a building or room except to those that have the key or code to enter. However, it should be appreciated that if every door that utilized embodiments of the secure door device described herein, rescue or emergency personnel would have to carry boxes of keys around with them and ensure a method to index those keys for rapid access. Initial embodiments of the present invention may simply utilize a specialized tool that is only available to essential personnel. As such, the same tool may be utilized for each of the doors within a facility. Further, the tool may be stored in a location that is only accessible to emergency personnel when they arrive at the location. Thus, the emergency personnel can access the safety box, such a safe, to obtain the tool and then proceed to unlock any doors that need to be opened.

In other embodiments, an electronic key may be utilized. Using this technique, the secure door locks can be updated with new codes and emergency personnel can also be updated. To access a door, the digital key can simply be held to the secure door device and if the secure door device is in the locked state, it will transition to the open state.

Figure 11B:
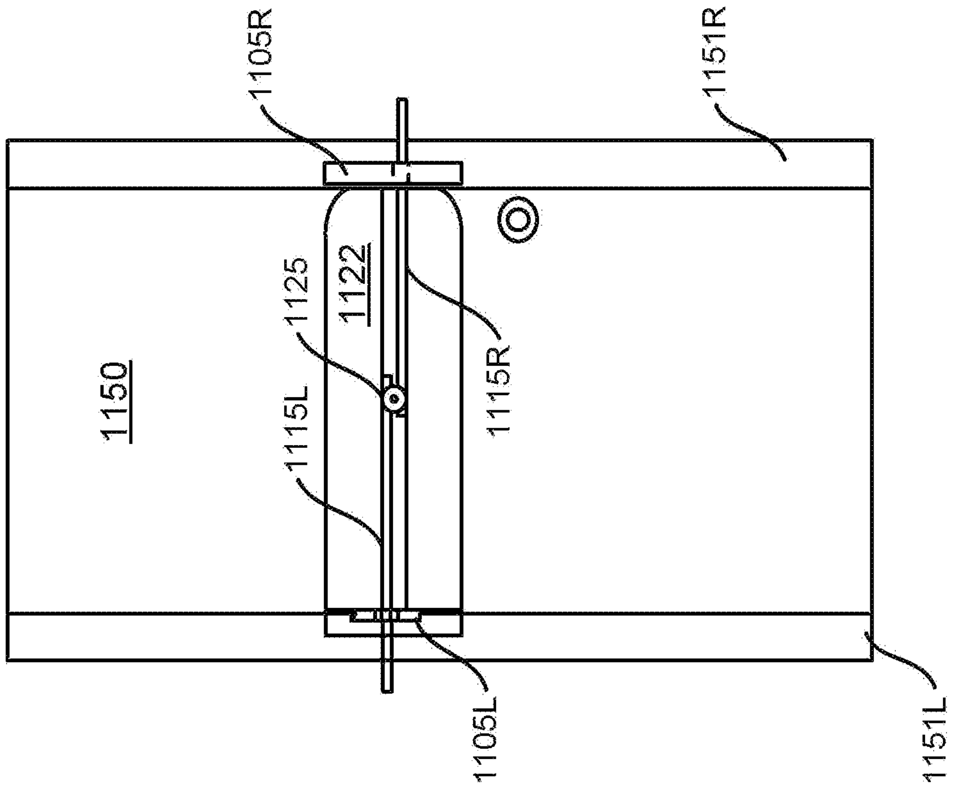
FIG. 11B is a conceptual diagram illustrating a security device that provides a double slide bolt action in a locked state.
Figure 11A:
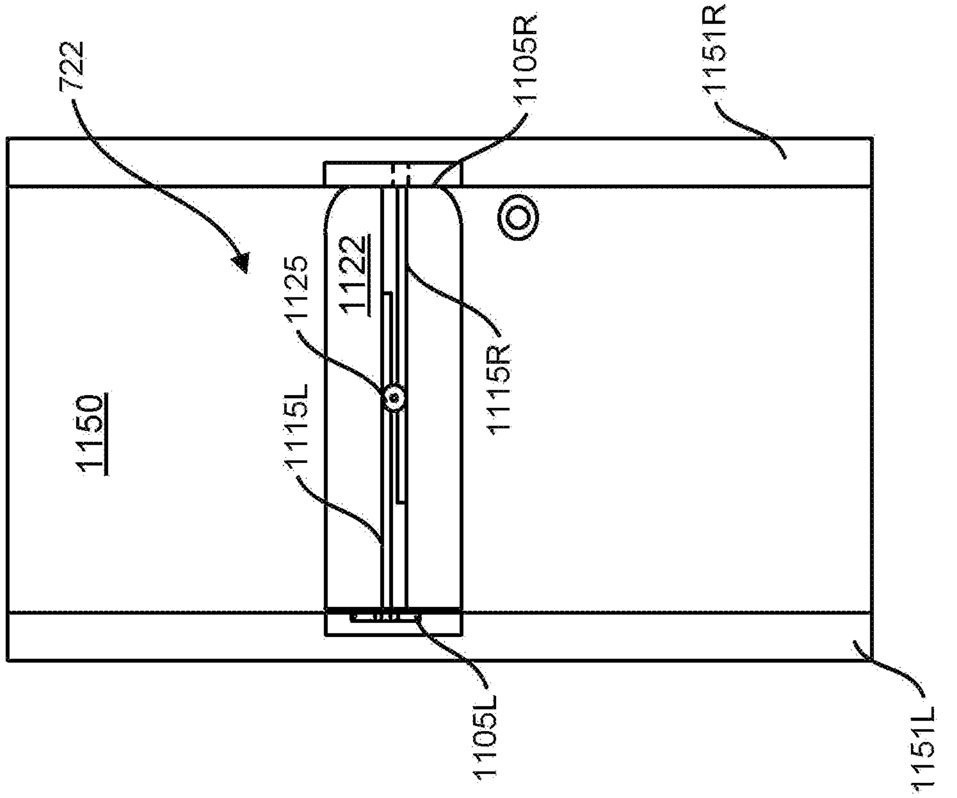
FIG. 11A is a conceptual diagram illustrating a security device that provides a double slide bolt action in an unlocked state.

FIG. 11A is a conceptual diagram illustrating a security device that provides a double slide bolt action in an unlocked state. FIG. 11B is a conceptual diagram illustrating a security device that provides a double slide bolt action in a locked state. In the illustrated embodiment, a door 1150 is illustrated as being installed between two door jambs 1151L and 1151R. In this embodiment a double slide bolt is utilized such that the door 1150 can be secured on both the hinge side and the knob side. A receiver in the form of a barrel component 1105L is shown as being installed on the left-side jamb 1151L and a receiver 1105R is installed on the right-side jamb 1151R. The latch assembly 1122 in this embodiment extends across the entire face of the door 1150 and includes two slide bars 1115L and 1115R. Actuator 1125 is position on the latch assembly 1122 and is used to control the extension and retraction of both of the slide bars 1115L and 1115R. In operation, when the actuator 1125 is exercised, the slide bar 1115L is moved towards the left, through an aperture in the pin similar to FIG. 1A and FIG. 1B, and then is flush against the outer surface of the barrel component 1105L. At the same time, bar 1115R moves to the right and through the aperture in receiver 1105R similar to the embodiment illustrated in FIG. 8A and FIG. 8B. FIG. 11B shows the slide bars 1115L and 1115R expanded such that the door 1150 is in the locked state. As presented in the other embodiments, an aperture through the door 1150 can provide access to a port on the back side of the latch assembly 1125 to enable first responders, rescue personnel, family, school faculty, etc. to gain access to the area restricted by the looked door 1150.

In some embodiments, an interior and/or exterior indicator may be utilized to indicate if the secure door device is in the locked or unlocked position. For instance, an LED may be used and when the LED is green, it can indicate that the secure door device is unlocked. When the secure door device transitions to the locked state, the LED can change to the color red.

A system and method of use for a new and useful door security device has been described using detailed descriptions of embodiments thereof that are provided by way of example and are not intended to limit the scope of the disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art. It will be appreciated by persons skilled in the art that a hinge-side door security device according to the solution is not limited by what has been particularly shown and described herein above. Rather, the scope of the disclosed solution is defined by the claims that follow.

What is claimed is:

1. A security device for locking a double door mounted in a non-mullion passageway, the security device comprising:

a latching element coupled to an interior surface of a first door of the double door, wherein:

the latching element comprises a sliding bolt featuring a plurality of grooves around its circumference and an actuator operable for transitioning the sliding bolt between a locked state and an unlocked state, and the latching element is positioned proximate to an edge of the first door associated with a door knob;

a receiving element coupled to an interior surface of a second door of the double door, wherein:

the receiving element comprises an aperture featuring a plurality of grooves within its interior; and the receiving element is positioned proximate to an edge of the second door that is adjacent the edge of the first door associated with the door knob such that the aperture is positioned to receive the sliding bolt when the actuator is utilized to transition the sliding bolt to the locked state;

a safety release accessible from a port in an exterior surface of the first door, the port providing access to the actuator such that the sliding bolt can be transitioned to an unlocked state; and wherein, when the sliding bolt is positioned in the locked state, the plurality of grooves around the circumference of the sliding bolt are operable to engage with the plurality of grooves within the interior of the aperture such that disengagement of the sliding bolt from the aperture is prevented when pressure is applied to the double door.

2. The security device of claim 1, wherein the actuator comprises a rack and pinion mechanism such that, when the pinion is rotated, a rack associated with the sliding bolt transitions the sliding bolt between locked and unlocked states.

* * * * *